US011991148B2

(12) United States Patent
Fu et al.

(10) Patent No.: US 11,991,148 B2
(45) Date of Patent: May 21, 2024

(54) AUTOMATED CREATION OF TRUSTED NETWORK PERIMETER

(71) Applicant: Okta, Inc., San Francisco, CA (US)

(72) Inventors: Jinlong Fu, Oakville (CA); RaghuRam Pamidimarri, Union City, CA (US)

( * ) Notice: Subject to any disclaimer, the term of this patent is extended or adjusted under 35 U.S.C. 154(b) by 0 days.

(21) Appl. No.: 18/361,512

(22) Filed: Jul. 28, 2023

(65) Prior Publication Data

US 2023/0379299 A1 Nov. 23, 2023

Related U.S. Application Data

(63) Continuation of application No. 17/161,398, filed on Jan. 28, 2021, now Pat. No. 11,765,129.

(51) Int. Cl.
*H04L 9/40* (2022.01)
*G06N 20/00* (2019.01)

(52) U.S. Cl.
CPC ......... *H04L 63/0209* (2013.01); *G06N 20/00* (2019.01); *H04L 63/0236* (2013.01); *H04L 63/1433* (2013.01); *H04L 63/20* (2013.01)

(58) Field of Classification Search
CPC ............. H04L 63/0209; H04L 63/0236; H04L 63/1433; H04L 63/20; G06N 20/00
See application file for complete search history.

(56) References Cited

U.S. PATENT DOCUMENTS

| 9,288,220 | B2 | 3/2016 | Raugas et al. |
| 10,063,582 | B1 * | 8/2018 | Feng ................... H04L 63/1433 |
| 10,476,779 | B1 | 11/2019 | Barth et al. |
| 11,206,265 | B2 * | 12/2021 | Burton ................. H04L 63/1425 |
| 11,765,129 | B2 | 9/2023 | Fu et al. |
| 11,770,388 | B1 * | 9/2023 | Laconic ................... H04L 63/20 726/23 |
| 2013/0097657 | A1 | 4/2013 | Cardamore et al. |
| 2017/0230403 | A1 * | 8/2017 | Kennedy ............. H04L 63/1483 |

(Continued)

OTHER PUBLICATIONS

Cloudflare, "What is the network perimeter?," Date Unknown, four pages, [Online] [Retrieved on Mar. 4, 2021] Retrieved from the Internet <URL: https://www.cloudflare.com/learning/access-managemenUwhat-is-the-network-perimeter/>.

(Continued)

*Primary Examiner* — Kambiz Zand
*Assistant Examiner* — Afaq Ali
(74) *Attorney, Agent, or Firm* — Holland & Hart LLP

(57) ABSTRACT

A system generates network perimeter for an organization based on the connection data. The system builds a model, for example, a machine learning based model configured to receive a network zone as input and output a score indicating security of the network zone. The system receives information describing connection requests received from client devices associated with the organization. The system adjusts parameters of the machine learning based model based on information describing the connection requests. The adjusting of the machine learning based model improves the accuracy of prediction based on the information describing the connection requests. The system determines a network perimeter for the organization using the machine learning based model. The network perimeter may be used for implementing a network policy for the organization based on the determined network perimeter.

15 Claims, 6 Drawing Sheets

(56) References Cited

U.S. PATENT DOCUMENTS

| | | | |
|---|---|---|---|
| 2018/0367551 A1 | 12/2018 | Muddu et al. | |
| 2019/0387005 A1* | 12/2019 | Zawoad | H04L 61/4511 |
| 2020/0274852 A1 | 8/2020 | Ahmed et al. | |
| 2021/0281492 A1* | 9/2021 | Di Pietro | G06N 5/022 |
| 2022/0215319 A1* | 7/2022 | Amrod | G06N 5/025 |

OTHER PUBLICATIONS

Okta, "Okta ThreatInsight: Automated detection and prevention against identity attacks," Date Unknown, pp. 1-12.

\* cited by examiner

AUTOMATED CREATION OF TRUSTED NETWORK PERIMETER

CROSS REFERENCE

The present Application for Patent is a Continuation of U.S. patent application Ser. No. 17/161,398 by Fu et al., entitled "AUTOMATED CREATION OF TRUSTED NETWORK PERIMETER" filed Jan. 28, 2021, which is assigned to the assignee hereof, and which is hereby expressly incorporated by reference herein in its entirety.

FIELD OF ART

This disclosure generally relates to the field of computer networks, and more specifically, to automatic determination of trusted network perimeter for an organization based on data describing connections established by client devices associated with the organization.

BACKGROUND

Organizations use various computing resources to store and process information. Computer networks are used to perform interactions between various computing systems of the organization. Organizations implement network security using policies that prevent unauthorized access or misuse of network-accessible computing resources. Network security policies allow the organization to prevent attacks such as wiretapping, computer viruses, worms, SQL injection attacks, cross-site scripting, denial of service attacks, and so on.

To effectively implement network security policies, an organization typically determines a network perimeter for the organization. Organizations require network administrators to define the network perimeter using network zones. However, definition of network zones requires knowledge and understanding of internet address standards (1Pv4 and 1Pv6) and how they map to the geographic location of their user base. Due to the depth of technical expertise required, network administrators often don't provide the information needed to define the network perimeter. Furthermore, the information needed to define the network perimeter often changes and becomes out of date unless the network administrators diligently update the information on a regular basis. As a result, the network perimeter definition of an organization is often incomplete or outdated, thereby making it difficult for the organization to effectively implement network security policies. This allows malicious actors to bypass network security and perform unauthorized access to computing resources of the organization.

SUMMARY

A system receives connection data from various client devices and generates network perimeter for an organization based on the connection data. The connection data may include information describing connection requests such as the network address from where the connection request was originated and the status of connection request indicating whether the connection was successfully established or denied. The connection request may include the number and type of authenticators (credentials such as username/password, SMS (short message service) OTP (one time password), etc.) used. The connection request may include destination of the request, for example, an authentication change request or a password change request may identify the destination system to which the request is targeted. A connection request received by a system may be any request to create a session with the system or a request to perform an interaction with the system, for example, an API (application programing interface) request.

The system initializes a model, for example, a machine learning based model configured to receive a network zone as input and output a score indicating security of the network zone in relation to an organization. Examples of network zones include internet protocol (IP) address, IP address range, geographical location, autonomous system number (ASN), internet service provider (ISP), proxy, and so on. In an embodiment, the machine learning based model is configured to receive information describing connection requests sent to the organization and outputs scores used for periodically determining the ideal network perimeter for the organization. An example of the input to the model could be the network address, location, device, timestamp associated with primary and multi factor authentication attempts to the organization. The output of the model is used to generate a recommendation for an administrator of the organization. The system consumes the actions taken by the administrator and the continuous stream of information describing the connection requests to adjust the parameters of the machine learning model.

In an embodiment, the system receives information describing connection requests that originated from client devices associated with the organization. A connection request originates from a network address and the information describing the connection request may indicate whether the connection request was successful. The system adjusts parameters of the machine learning based model based on the information describing the connection requests. The adjusting of the machine learning based model improves the accuracy of prediction based on the information describing the connection requests. The system determines a network perimeter for the organization using the machine learning based model. The network perimeter may be used for implementing a network policy for the organization based on the network perimeter.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Embodiments automatically define the network perimeter for a computer network of an organization. Automatic determination of the network perimeter results in reduction of effort on the part of the network administrators to specify network security zones. Furthermore, the network perimeter definition automatically determined by the system is more accurate and updated on a regular basis. The network perimeter may be determined by a computing system of an organization or may be determined by a third-party system that receives connection information for multiple organizations, for example, a multi-tenant system.

Figure 1:
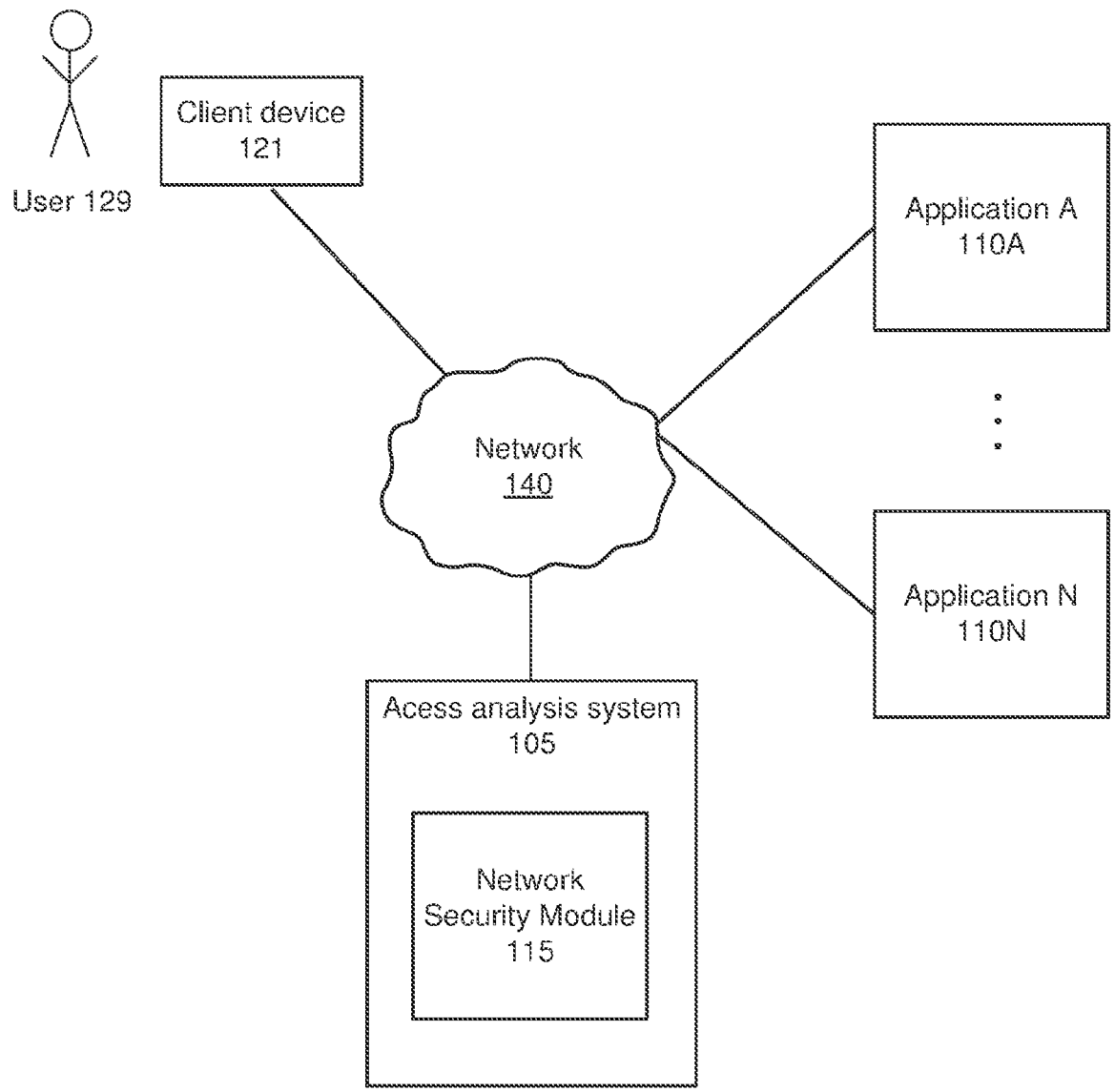
FIG. 1 illustrates one embodiment of a computing environment in which users use their client computing devices to access different applications over a computer network.

FIG. 1 illustrates one embodiment of a computing environment in which users use their client computing devices to access different applications over a computer network. Specifically, as illustrated in FIG. 1, a user 129 uses his or her client device 121 to access one or more of a set of possible applications 110 via a computer network 140. An access analysis system 105 obtains information describing connection requests received from client devices associated with an organization, learns from the obtained information, and applies its learning, for example, to determine a network perimeter for the organization. The applications 110 need not be related to each other, but rather may be created and/or hosted by different organizations. The applications 110 may be partly or entirely accessible via a server separate from and independent of an organization with which the user 129 is affiliated and/or the access analysis system 105. For example, the applications may be remote web-based applications accessible via a web server, applications implemented partially as local apps on the user's client device 121 and partially as server-based functionality that functions on a remote application server and with which the apps communicate, or the like. Some examples of possible applications 110 include GMAIL, SALESFORCE, MICROSOFT OFFICE 365, or the like.

The user 129 may use any client device 121 capable of accessing applications over networks. For example, the client device 121 could be a desktop computer, laptop computer, smartphone, set type box, or the like. An application sends a connection request to a server of an organization. Data describing the connection request is received by the access analysis system 105, for example, a network address from where the connection request was sent and information describing how the connection was processed by the systems of the organization, for example, whether the connection was established successfully, whether the connection was denied, whether the connection was required to pass enhanced authentication, whether the connection was established after multiple attempts to pass authentication, and so on.

Figure 2:
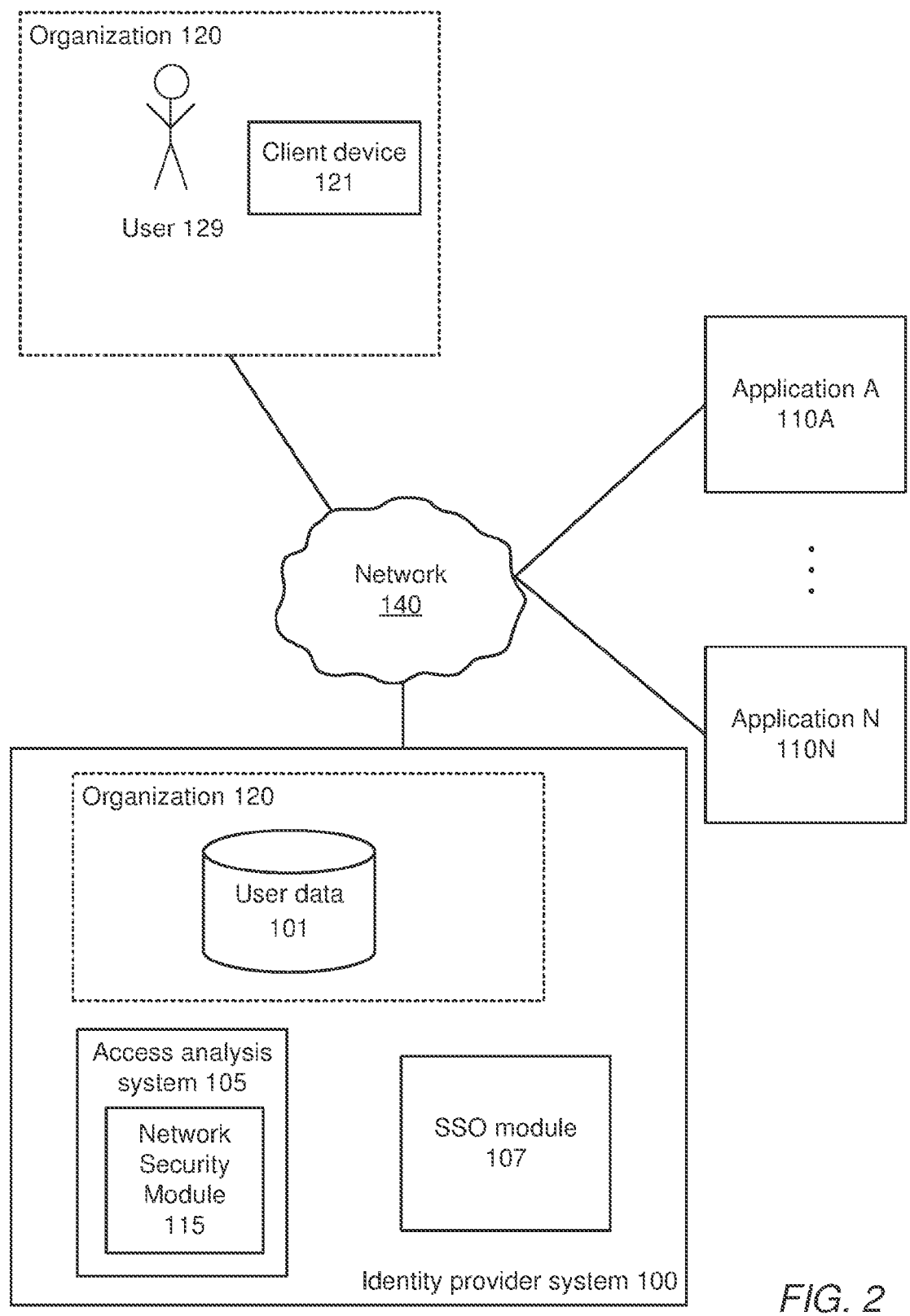
FIG. 2 illustrates one specific embodiment of the computer environment of FIG. 1, in which the access analysis system of FIG. 1 is a part of an identity provider system.

FIG. 2 illustrates one specific embodiment of the computer environment of FIG. 1, in which the access analysis system 105 is a part of an identity provider system 100. The identity provider system 100 provides identity services to different organizations 120 (e.g., businesses, charities, governmental entities, or the like) with whom it has an established relationship. The organizations 120 each have various members (e.g., the user 129) such as employees or volunteers, and the members may accomplish tasks on behalf of the organization using their client devices 121.

The users may have multiple accounts on different systems, and the systems may be owned and/or administered by different independent entities, such that the users may have a number of different identities—and corresponding credentials—across the different systems. The different accounts may provide the users with access to different resources, such as (for example) applications (e.g., email applications, timekeeping applications, spreadsheet applications, etc.) like the applications 110 depicted in FIGS. 1A and 1B, databases, files systems, or the like. Since each application 110 or other resource could be from a different provider each of which could have a different identity for a user, a single user will typically have many different identities and associated credentials corresponding to the different resources that the user uses. An identity provider (IdP) system provides users with a federated identity integrating the users' different identities on different accounts, thereby providing more convenient, efficient, and secure access to the different accounts. These entities are now described in more detail.

The identity provider system (IdP system) 100 provides the user 129 with a federated identity linking the various identities of the user on the different accounts (e.g., the applications 110) or other resources to which the user has access. The IdP system 100 stores user data 101 that include a set of identities of known users with accounts on the IdP system 100. The user data 101 may include a form of identity on the IdP system 100 such as a username, as well as other credential data associated with a user, such as a user password or information derived therefrom. The user data 101 may also include many other types of data about users, such as the factor types and providers that they may use when seeking identity verification from the IdP system 100, their role(s) or group(s) within the organization 120 to which they belong (e.g., "Engineering", "Legal", "Manager 2", "Director", or the like), and/or the resources to which they have access (e.g., third-party applications 110), as some examples. The user data 101 may also include identities and credentials of the various users on the various accounts to which they have access, thereby linking a user's identity on the IdP system 100 to the user's identities on those different accounts and (by extension) permitting access to those accounts. In some embodiments, the IdP system 100 is part of the organization 120, rather than being an independent entity as it is in other embodiments.

Software on the client device 121 facilitates providing users with federated identities by securely and transparently communicating with the IdP system 100 that handles the details of identity federation and provides related identity services. In this way, the users of the organization 120 simply and securely obtain access to the various third-party accounts or other resources that they need to complete tasks on behalf of the organization. The software on the client device 121 that communicates with the IdP system may (although need not) be provided by the entity responsible for the IdP system 100.

In some embodiments, the IdP system 100 includes a single sign-on (SSO) module 107 that allows the IdP system to transparently log a user in to the different accounts or other resources to which the user has access. For example, for a given user who has logged in to the IdP system 100, the SSO module 107 can look up the user's accounts or other resources within the user data 101, as well as the user's credentials for those accounts. Using the credentials, as well as metadata or other information about the accounts, the SSO module 107 can automatically log the user into the applications 110 or other resources described in the user data 101, such as by establishing application sessions with the various applications and providing corresponding session data (e.g., session tokens) to the device 121. Thus, with a single login to the IdP system 100, the SSO functionality of the IdP system provides a user with automatic access to all the user's accounts or other resources.

Physically, the organization 120 is made up of a number of computing systems, including the various client devices 121; one or more internal networks that connects the computing systems, including routers or other networking devices that define the boundary between the organization and external networks; and the like.

Similarly, the IdP system 100, although depicted as a single logical system in FIG. 1, may be implemented using a number of distinct physical systems and the connections between them, such as application servers, database servers, load-balancing servers, routers, and the like.

The network 140 may be any suitable communications network for data transmission. In an embodiment such as that illustrated in FIG. 1, the network 140 uses standard communications technologies and/or protocols and can include the Internet. In another embodiment, the entities use custom and/or dedicated data communications technologies.

In some embodiments, a client device 121 includes a number of components that a user 129 can use to accomplish tasks via applications or other resources, or that interface with the IdP system 100 in order to provide federated identities, SSO functionality, and/or other functionality. These components are now described in more detail.

The client device 121 may include a native application 122, which is a locally-installed application that communicates with a third-party application server 110 to provide application functionality, such as an email application, a chat application, an accounting application, or the like. For example, the native application 122 may provide the user interface for the application and communicate with its corresponding third-party application server 110 to access the user's data to display within the user interface. Alternatively, a given application may not be installed locally on the client device 121, but rather may be downloaded and executed entirely within a web browser on the client device 121, for example. (The terms "application 110", "application 122", or simply "application" are sometimes used interchangeably herein to general denote functionality of the application, whether it is implemented entirely on the application server 110, or partially on the application server 110 and partially via the native application 122.)

System Architecture

Figure 3:
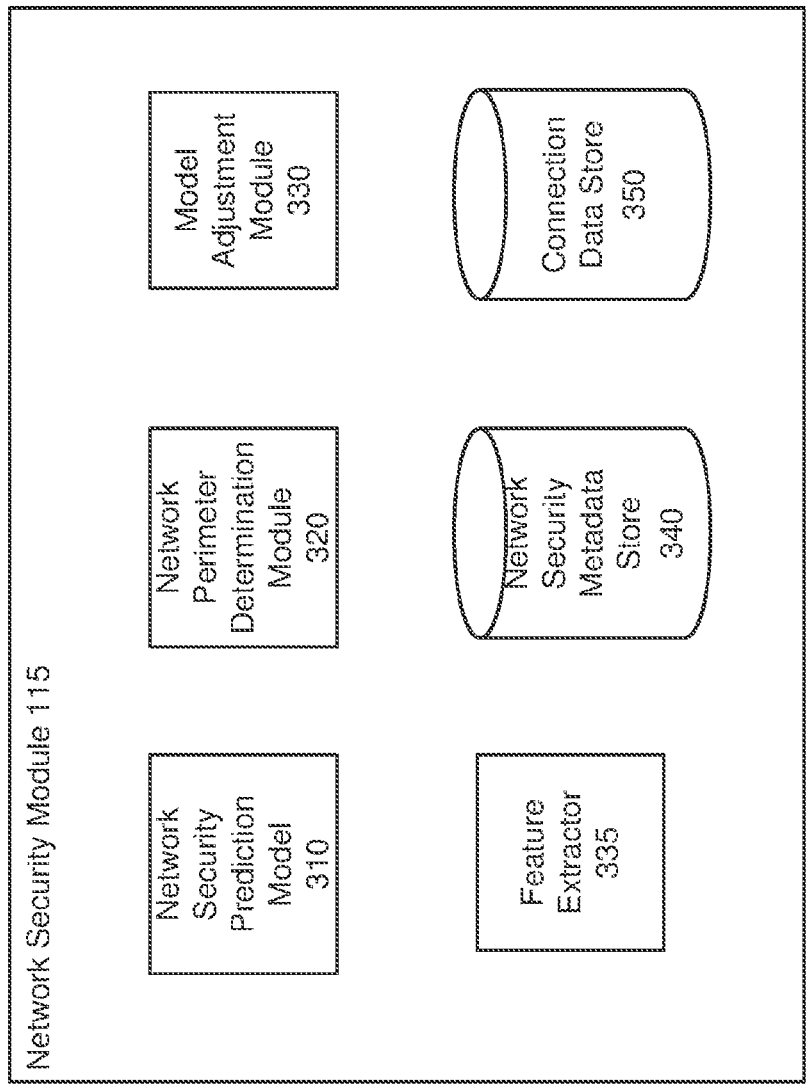
FIG. 3 shows the system architecture of a network security module, according to an embodiment.

FIG. 3 shows the system architecture of the network security module, according to an embodiment. The network security module 115 includes a network security prediction model 310, a network perimeter determination module 320, a model adjustment module 330, a network zone metadata store 340, and connection data store 350. Other embodiments may include more or fewer modules than those indicated in FIG. 3.

The network security metadata store 340 stores information describing network security for one or more organizations. According to some embodiments, the network security information describes network perimeter for an organization. A network perimeter may also be referred to as a trusted network perimeter or a network security perimeter. The network perimeter defines a secured boundary between the trusted side of a network, for example, the intranet, and the public facing side of a network that is not trusted, for example, the internet. The network perimeter may be defined using a set of network zones. A network zone represents one or more of (1) an internet protocol (IP) address (2) an IP address range, (3) a geographical location, (4) an autonomous system number, or (5) one or more proxies through which client devices may establish a connection with computing resources of the organization. The network perimeter describes whether a network zone is within the network perimeter of the organization or outside the network perimeter of the organization. The network security metadata store 340 may further store information describing networks, for example, attributes of a network indicating whether the network (or IP address) is public or private, whether an IP is a Tor IP or not, a measure of reputation of the network that may be obtained from a third party or determine via analytics performed by the access analysis system 105 or any other system.

The connection data store 350 stores information describing connection requests received by the computing systems of the organization. The information describing each connection request includes a network address from where the connection request was received and a status describing whether the connection request successfully established a connection with the computing system of the organization, or the connection request failed and was denied access. The connection data store 350 may further store information describing a connection request such as destination of the request. As an example, an authentication change request or a password change request may identify the destination system to which the request is targeted.

The network security prediction model 310 predicts a measure of security associated with a given network zones. According to an embodiment, the network security prediction model 310 accesses statistics describing past connection requests that originated within a given network zone to determine a likelihood of receiving a connection request originating within the network zone from a malicious actor. According to another embodiment, the network security prediction model 310 is a classifier associated with an organization that receives a network zone as input and predicts an output indicating whether the input network zone is within a network perimeter of the organization or outside the network perimeter of the organization.

In an embodiment, the network security prediction model 310 is a machine learning based model that is trained using a training data set generated from the connection data store. Training data may be obtained from other sources for example, based on information provided by experts or from an entity reputation store provided by a third party or obtained from internal analytics of the organization. For example, a system administrator may provide labelled dataset identifying a set of network zones determined to be within the network security parameter and a set of network zones determined to be outside the network security parameter for the organization. The machine learning based model may be trained as a classifier that predicts a binary output indicating whether an input network zone is within the network security parameter or outside the network security parameter for the organization. The machine learning based model may predict a confidence interval representing a greater than a threshold likelihood that the input network zone is within the network security parameter.

According to an embodiment, the network security prediction model 310 is a machine learning based model that receives a network zone as input and outputs a score indicating a likelihood that the network zone is within the network perimeter of the organization. The network perimeter determination module 320 may compare the score with a threshold to determine whether the network zone is within the network perimeter of the organization or outside.

The machine learning based model receives various features describing the connection data corresponding to the network zone. The feature extractor 335 extracts various features for providing as input to the machine learning based model. Following are examples of features that are extracted by the feature extractor 335 and provided as input to the machine learning based models. An example of a feature extracted by the feature extractor 335 is an aggregate value based on connection data, for example, an aggregate rate of success of connections that originated from the network zone or an aggregate rate of denial of connection requests originating from the network zone. The feature extractor 335 aggregates the connection data across various connection requests that originated from network addresses within the network zone to determine features for the network zone.

In an embodiment, a feature extracted by the feature extractor 335 for providing as input to the machine learning based model is the percentage of connections requests that are successful and the percentage of connection requests that are denied. In an embodiment, the feature extractor 335 generates a histogram representing the rates of various status values of the connection requests originating from network addresses within the network zone. The connection request may return various status values, for example, status value representing success, status value representing failure, status value representing that enhanced authentication was requested from the user, status value representing indicating that the user made multiple attempts to establish a connection, and so on. Another feature extracted by the feature extractor represents an aggregate measure (e.g., average values) of the number of attempts made for establishing a connection by a client device having a network address within the network zone. In an embodiment, the feature extractor 335 extracts a feature representing distribution of various types of unauthorized access requests received from network addresses within the network zone, for example, a histogram representing a frequency of each type of unauthorized access request. Examples of unauthorized access requests include, computer viruses or worms, SQL injection attacks, cross-site scripting, denial of service attacks, and so on. Other features extracted by the feature extractor 335 include the percentage of unknown user name inputs in connection requests, portion of connection requests that are distinguished IP addresses, percentage of proxy counts in connection requests, and so on.

According to an embodiment, the network security prediction model 310 is a neural network that receives connection data for a network zone to predict whether the network zone is within the network perimeter of the organization. In an embodiment, the network security prediction model 310 is a recurrent neural network that may be provided as input a sequence of connection data. The recurrent neural network is able to process variable length sequences of connection data to predict whether the network zone is within the network perimeter of the organization. The neural network generates features from the raw connection data received as input. For example, the hidden layers of the neural network generate features based on the connection data and use the feature values to determine the output of the neural network.

The network perimeter determination module 320 uses the network security prediction model 310 to determine a network perimeter for an organization. The network perimeter determination module 320 identifies various network zones and applies the network security prediction model 310 to the identified zones to determine whether each network zone is within the network perimeter of the organization or outside the network perimeter of the organization. The network perimeter determination module 320 builds a network perimeter for the organization using the information determined using the network security prediction model 310. In an embodiment, the network security prediction model 310 determines a network perimeter as a set of network zones and information indicating whether each network zone is within the network perimeter of the organization or outside the network perimeter of the organization. The network perimeter determination module 320 stores the network perimeter information in the network security metadata store 340.

The model adjustment module 330 periodically adjusts parameters of the network security prediction model 310 for an organization to improve the accuracy of prediction of the model. For example, the model adjustment module 330 may periodically access the connection data store 350 to get the latest connection information and adjust the model parameters based on the latest information. The model adjustment module 330 accesses user feedback on recommendations for network perimeter made by the network perimeter determination module 320 and uses the feedback to adjust the parameters of the model. The machine learning model according to these embodiments is a semi-supervised learning based model.

Overall Process

Figure 4:
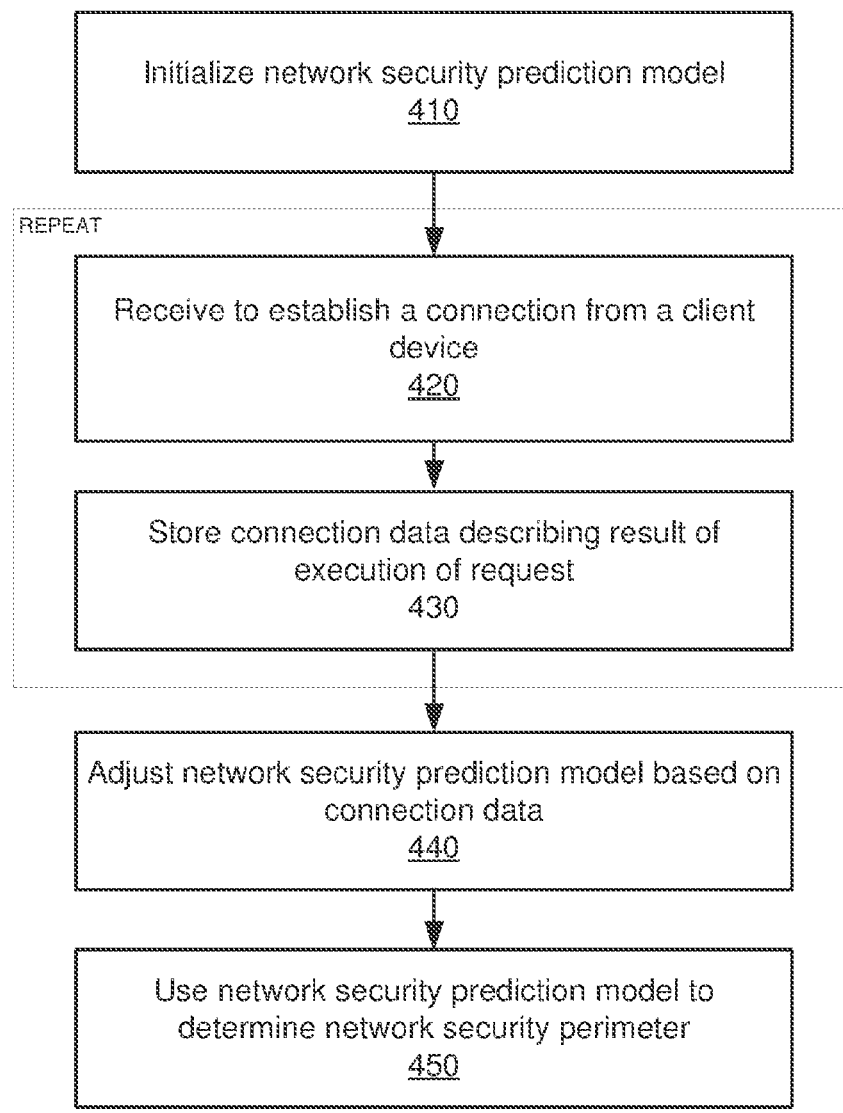
FIG. 4 shows a flowchart illustrating a process of building a model for determining network perimeter for an organization, according to an embodiment.

FIG. 4 shows a flowchart illustrating a process of building a model for determining network perimeter for an organization, according to an embodiment. The steps of the processes indicated herein using flowcharts may be performed in an order different from that indicated herein.

The network security module 115 initializes 410 the network security prediction model. For example, the network security module 115 may initialize 410 the network security prediction model using parameters values obtained for other organizations as default values. The network security module 115 may repeat the following steps 420 and 430 multiple times, for example, over a time interval and repeated across multiple time intervals. The network security module 115 receives 420 request to create a connection from client devices associated with an organization. The network security module 115 may process the connection request according to network security policies of the organization. The network security module 115 stores 430 connection data describing result of executing the request to establish the connection.

The network security module 115 adjusts the network security prediction model based on the recent connection data collected over a recent time interval. For example, the network security module 115 may store one or more network zones with known security characteristics. For example, the network security module 115 may store information indicating that a set of network zones is within the network perimeter of the organization and another set of network zones that is outside the network perimeter of the organization. The network security module 115 updates the connection statistics for these network zones based on the recent connection data. The network security module 115 uses the updated connection information as labelled training data and adjusts the parameters of the network security prediction model 310 based on the updated connection data by retraining the machine learning based model.

The network security module 115 uses the network security prediction model 310 to determine 450 network security perimeter for the organization. For example, the network security module 115 may identify new network zones and determine whether they are within the network perimeter or outside the network perimeter of the organization. The network security module 115 may adjust existing network zones, for example, by changing the boundaries of the network zones. For example, the network security module 115 may take a network zone represented as an IP range and reduce the IP range to exclude some IPs that are determined to have less than a threshold likelihood to be within the network perimeter of the organization. The network security module 115 may take a network zone represented as an IP range and increase the IP range to include some IPs that are determined to have more than a threshold likelihood to be within the network perimeter of the organization. The network security module 115 may modify a network zone represented as a geographical region by excluding some locations that are determined to have less than a threshold likelihood to be within the network perimeter of the organization or by including some locations that are determined to behave more than a threshold likelihood to be within the network perimeter. The network security module 115 may take a network zone and split it into smaller network zones that may have different security properties. The network security module 115 may combine two network zones used to define the network perimeter to determine a combined network zone and use the combined network zones in the definition of the network perimeter.

Figure 5:
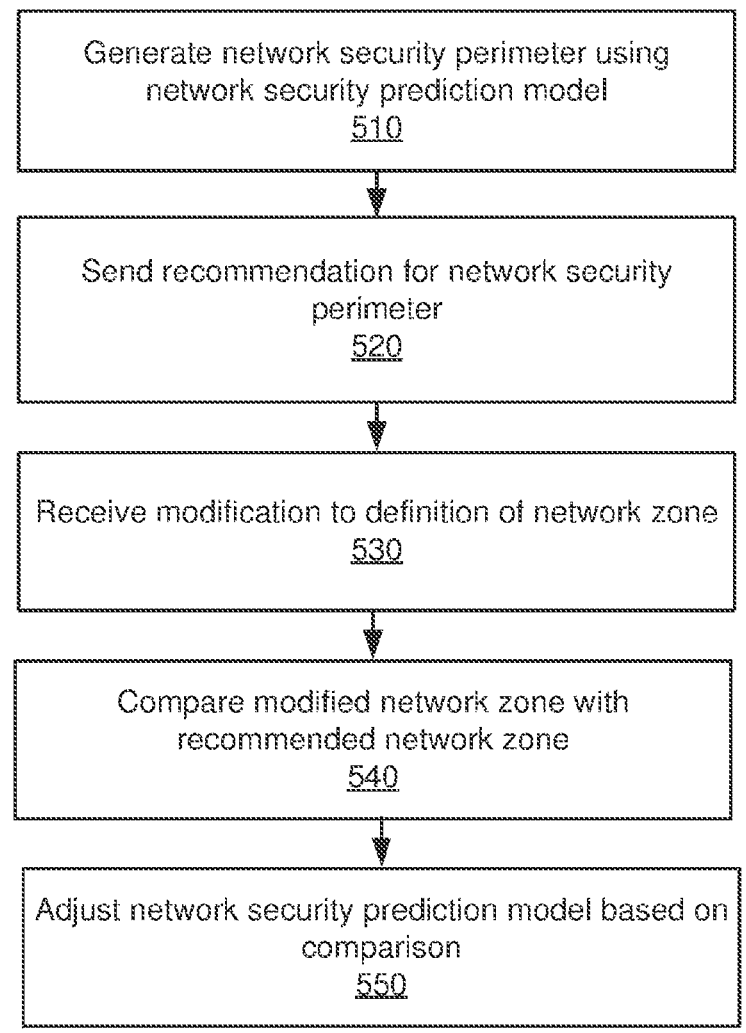
FIG. 5 shows a flowchart illustrating a process of using feedback to adjust the model for determining network perimeter for an organization, according to an embodiment.

FIG. 5 shows a flowchart illustrating a process of using feedback to adjust the model for determining network perimeter for an organization, according to an embodiment.

The network security module 115 generates network perimeter for the organization using the network security prediction model 310. For example, the network security module 115 may identify one or more network zones that are determined to be within the network perimeter or outside the network perimeter.

The network security module 115 sends recommendations of network zones and their relations to the network perimeter. The network security module 115 may send the recommendation to a user interface of an application used by a system administrator, for example, a network administrator. The network security module 115 receives 530 modifications to network perimeter definitions specified by the system administrator. For example, the system administrator may add, remove, or modify network zones in the network perimeter specification.

The network security module 115 compares 540 the changes received with the recommendations made to the system administrator. In an embodiment, the network security module 115 receives feedback for the recommendations via a user interface that allows the system administrator to approve or disapprove any recommendation or modify the recommendation before approving the recommendation. Once the recommendation is approved the network perimeter is adjusted based on the recommendation.

The network security module 115 adjusts 550 the network security prediction model based on the results of the comparison or the result of the feedback received from a user, for example, a network administrator. In an embodiment, the network security module 115 calculates a loss function that represents a measure of a difference between the predicted output by the machine learning based model and the actual result as indicated by the network perimeter specified by the system administrator. The loss function is recalculated when the network perimeter gets modified. The network security module 115 modifies the parameters of the machine learning based model to reduce the loss function. In an embodiment, the network security module 115 uses back propagation to adjust the parameters to minimize the loss function.

The network perimeter determined by the techniques disclosed herein is used to implement network policies. For example, if the type of authentication required for a client devices sending a connection request originating in a network zone is determined based on the security characteristics of the network zone as defined by the network perimeter. The network policy may block connections requests from network zones determined to be outside the network perimeter. The network policy may require enhanced authentication for client devices sending connection requests from network zones outside the network perimeter and less stringent authentication for client devices sending connection requests from network zones within the network perimeter. The network policy may allow limited access to computing resources for connections established by client devices from network zones outside the network perimeter of the organization. Automatic determination of network perimeter using the techniques disclosed herein allows an organization to implement such network policies effectively and accurately. The system may automatically implement a network policy based on a network perimeter definition or may implement a network policy after getting an approval from users, for example, network administrators.

Computer Architecture

Figure 6:
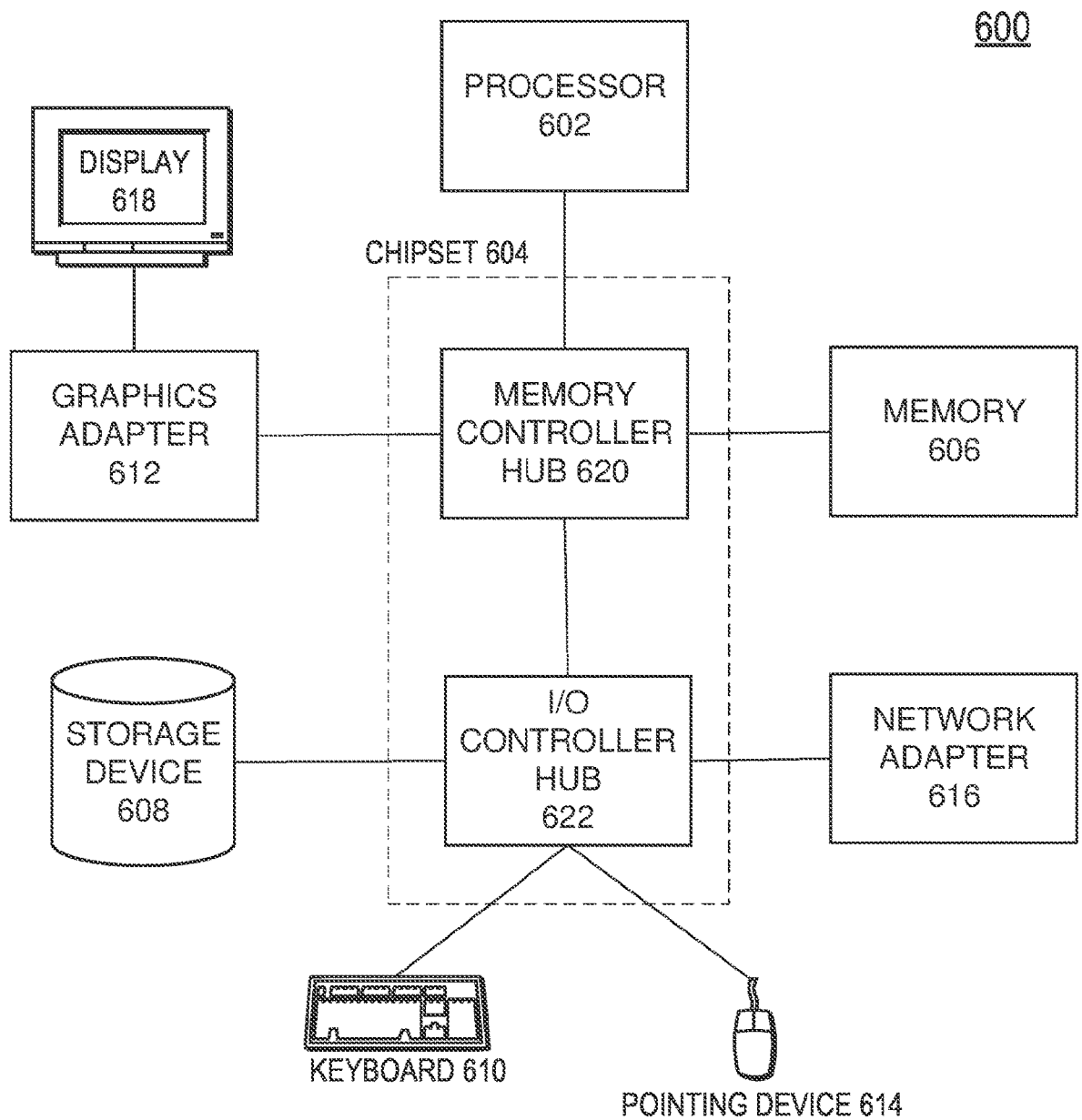
FIG. 6 is a high-level block diagram illustrating physical components of a computer used as part or all of (for example) the identity provider system or the client device of FIGS. 1-2, according to one embodiment.

FIG. 6 is a high-level block diagram illustrating physical components of a computer 600 used as part or all of (for example) the identity provider 100, the client device 121, and/or the third-party application server 110, according to one embodiment. Illustrated are at least one processor 602 coupled to a chipset 604. Also coupled to the chipset 604 are a memory 606, a storage device 608, a graphics adapter 612, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is any non-transitory computer-readable storage medium, such as a hard drive, compact disk read-only memory (CD-ROM), DVD, or a solid-state memory device. The memory 606 holds instructions and data used by the processor 602. The graphics adapter 612 displays images and other information on the display 618. The network adapter 616 couples the computer 600 to a local or wide area network.

As is known in the art, a computer 600 can have different and/or other components than those shown in FIG. 6. In addition, the computer 600 can lack certain illustrated components. In one embodiment, a computer 600 acting as a server may lack a graphics adapter 612, and/or display 618, as well as a keyboard 610 or pointing device 614. Moreover, the storage device 608 can be local and/or remote from the computer 600 (such as embodied within a storage area network (SAN)).

As is known in the art, the computer 600 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 608, loaded into the memory 606, and executed by the processor 602.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A method comprising:
  receiving connection data corresponding to network requests of client devices associated with a network, wherein an item of the connection data includes at least one network address;
  training a machine learning model using the connection data, wherein the machine learning model is configured to output scores for network zones input into the machine learning model;
  receiving a network zone;
  inputting the network zone into the machine learning model to obtain a corresponding score, the corresponding score representing a security of the network zone relative to the network;
  displaying data to a network administrator, the data representing the corresponding score and a recommendation;
  receiving an approval of the recommendation from the network administrator; and
  modifying a network operation of the network based on the corresponding score after receiving the approval.

2. The method of claim 1, wherein the at least one network address comprises an Internet Protocol address of a sender of a network request corresponding to the item of connection data.

3. The method of claim 1, wherein the network zone comprises one of an Internet Protocol address, an Internet Protocol address range, a geographical location, an autonomous system number, or one or more proxies.

4. The method of claim 1, wherein the machine learning model comprises a neural network.

5. The method of claim 4, further comprising receiving updated connection data and re-training the neural network using the updated connection data.

6. The method of claim 1, wherein modifying the network operation comprises adjusting at least one network policy based on outputs of the machine learning model.

7. The method of claim 6, wherein adjusting at least one network policy comprises automatically adjusting a network perimeter boundary based on the outputs of the machine learning model.

8. A non-transitory computer-readable storage medium for tangibly storing computer program instructions capable of being executed by at least one computer processor, the computer program instructions defining steps of:
- receiving connection data corresponding to network requests of client devices associated with a network, wherein an item of connection data includes at least one network address, the at least one network address comprising an Internet Protocol address of a sender of a network request corresponding to the item of connection data;
- training a machine learning model using the connection data, the machine learning model configured to output scores for network zones input into the machine learning model;
- receiving a network zone, wherein the network zone comprises one of an Internet Protocol address, an Internet Protocol address range, a geographical location, an autonomous system number, or one or more proxies;
- inputting the network zone into the machine learning model to obtain a corresponding score, the corresponding score representing a security of the network zone relative to the network;
- displaying data to a network administrator, the data representing the corresponding score and a recommendation;
- receiving an approval of the recommendation from the network administrator; and
- modifying a network operation of the network based on the corresponding score after receiving the approval.

9. The non-transitory computer-readable storage medium of claim 8, wherein the machine learning model comprises a neural network.

10. The non-transitory computer-readable storage medium of claim 9, the steps further comprising receiving updated connection data and re-training the neural network using the updated connection data.

11. The non-transitory computer-readable storage medium of claim 8, wherein modifying the network operation comprises adjusting at least one network policy based on outputs of the machine learning model.

12. The non-transitory computer-readable storage medium of claim 11, wherein adjusting the at least one network policy comprises automatically adjusting a network perimeter boundary based on the outputs of the machine learning model.

13. A device comprising:
- at least one processor; and
- a storage medium for tangibly storing thereon logic for execution by the at least one processor, the logic comprising instructions for:
  - receiving connection data corresponding to network requests of client devices associated with a network, wherein an item of connection data includes at least one network address, the at least one network address comprising an Internet Protocol address of a sender of a network request corresponding to the item of connection data;
  - training a machine learning model using the connection data, the machine learning model configured to output scores for network zones input into the machine learning model;
  - receiving a network zone, wherein the network zone comprises an Internet Protocol address;
  - inputting the network zone into the machine learning model to obtain a corresponding score, the corresponding score representing a security of the network zone relative to the network;
  - displaying data to a network administrator, the data representing the corresponding score and a recommendation;
  - receiving an approval of the recommendation from the network administrator; and
  - modifying a network operation of the network based on the corresponding score after receiving the approval.

14. The device of claim 13, the instructions further comprising receiving updated connection data and re-training the machine learning model using the updated connection data.

15. The device of claim 13, wherein modifying the network operation comprises adjusting a network perimeter boundary based on outputs of the machine learning model.

* * * * *